United States Patent [19]

Komoto

[11] Patent Number: 4,542,799

[45] Date of Patent: Sep. 24, 1985

[54] DISPLAY DEVICE FOR USE IN AN ELECTRONIC BALANCE

[75] Inventor: Akira Komoto, Shiga, Japan

[73] Assignee: Shimadzu Corporation, Kyoto, Japan

[21] Appl. No.: 479,333

[22] Filed: Mar. 28, 1983

[30] Foreign Application Priority Data

Apr. 28, 1982 [JP] Japan .................................. 57-72274
Apr. 28, 1982 [JP] Japan ............................ 57-62546[U]
May 26, 1982 [JP] Japan ............................ 57-78215[U]

[51] Int. Cl.⁴ ...................... G01G 23/30; G01D 13/22
[52] U.S. Cl. .............................. 177/177; 177/DIG. 3; 116/300; 116/DIG. 32
[58] Field of Search ................. 177/177, 185, DIG. 3; 116/300, DIG. 32

[56] References Cited

U.S. PATENT DOCUMENTS 4,076,088 2/1978 Gallo et al. ...................... 177/177 X
4,102,421 7/1978 Ozaki et al. ......................... 177/185

*Primary Examiner*—George H. Miller, Jr.
*Attorney, Agent, or Firm*—Koda and Androlia

[57] ABSTRACT

A display device for use in association with an electronic balance, the display device comprising a first display section for digital representation of the values measured from the loads applied to the scale pan of the balance, and a second display section for analog representation of selected digits in the digital representation except for the one in the highest significant position.

6 Claims, 8 Drawing Figures

DISPLAY DEVICE FOR USE IN AN ELECTRONIC BALANCE

BACKGROUND OF THE INVENTION

The present invention relates to a display device for use in association with an electronic balance, the display device being adapted to display measured values for visual inspection.

In the known electronic balances a load applied to a scale pan is electrically converted into visual representations, in most cases by digits. When a definite but unknown quantity is measured, the digital representation will be convenient for visual inspection. However, when a changing quantity is measured, the digitized values also change, which makes it difficult to read the representations on the display screen. Such a situation happens when a liquid is added into the vessel placed on the scale pan until a required quantity is acquired. In this case the analog representation is more desirable. An electronic balance is known, which has a display device for digital and analog representations, but in the known display devices 10 or 20 display elements are arranged in such a manner as to correspond to all measured values. However, the resolving power of this system is not sufficient for knowing a specific portion of values which rapidly change in the digital representation. After all, the known display device is not practical, but rather ornamental, only appealing to the user's fancy interest.

OBJECTS AND SUMMARY OF THE INVENTION

The present invention aims at solving the problems pointed out above with respect to the known display device capable of digital and analog representation, and has for its object to provide an improved display device capable of representing the measured values by digits, and representing a selected portion of the digitized values which are changing in accordance with the changes in the quantity to be measured.

Other objects and advantages of the present invention will become more apparent from the following description when taken in connection with the accompanying drawings, which show, by way of illustration only, a display device of the invention.

According to the present invention, there is provided a display device for use in an electronic balance, the display device comprising a first display section for digital representation of the values measured from loads applied to the scale pan of the balance, and a second display section for analog representation of selected digits in the digital representation except for the one in the highest significant position.

DETAILED DESCRIPTION OF THE INVENTION

Figure 1:
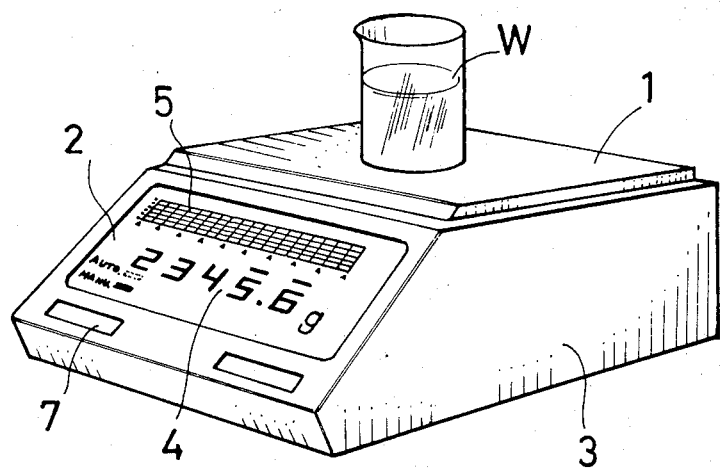
FIG. 1 is a perspective view showing an electronic balance incorporating a display device embodying the present invention.

FIG. 1 illustrates an electronic balance in which a display device embodying the present invention is incorporated. The reference numeral 3 designates a cabinet on which a scale pan 1 is provided. An object placed on the scale pan 1 is weighed, and the measured value is displayed on a display console 2 for visual inspection. The display console 2 is located on the front panel of the cabinet 3. The display console 2 includes two display sections 4 and 5; the section 4 is for digital representation, and the section 5 is for analog representation. Both sections 4 and 5 are interconnected such that a selected portion of the values digitized on the display section 4 is also displayed in an analog form in the display section 5.

Figure 2:
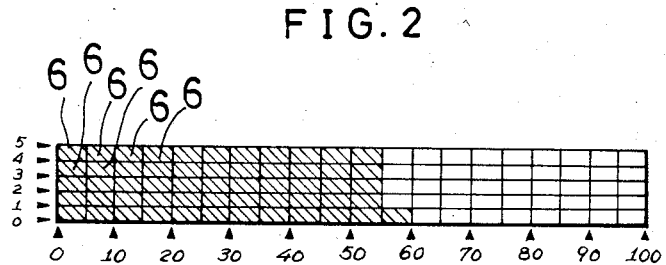
FIG. 2 is a schematic front view on an enlarged scale of the analog representation appearing on the display console.
Figure 3:
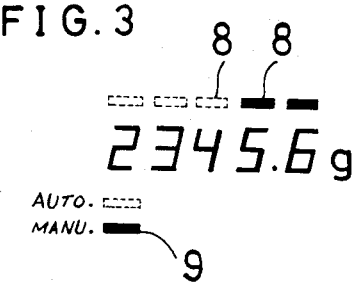
FIG. 3 is a schematic front view on an enlarged scale of the digital representation appearing on the display console.

The analog display section 5 includes 100 display elements 6 which are arranged in a plurality of lines as implied in FIG. 2. In this arrangement the analog representation effected by the elements 6 changes in a continuous manner from the left-hand lowermost corner toward the right-hand uppermost corner in accordance with the changes of their corresponding digits in the digital representation. As a whole the analog representation is shown as a lighting bar. The element 6 is made by an emission diode, liquid crystal or fluorescence material. The selection of a desired portion of the digits is carried out by a selection key 7. FIG. 3 shows that 2 digits "5" and "6" are selected, wherein the selected digits are identified by indicators 8. By operating the selection key 7, the system can be set to the automatic mode, in which the selection of the desired digits is automatically carried out. Once the automatic mode has been set, a predetermined digit or digits for analog representation is automatically selected in the course of the digital changes occurring in accordance with an increase or decrease in the quantity being measured. The automatic selection of digits ensures the operational security, and eases the operator's nerves. As shown in FIG. 3, an Auto/Manu indicator 9 shows which mode is selected, manual or automatic.

An example of the operation will be explained, from which it will be appreciated that the present invention has many advantages over the known display device capable of digital representation alone:

A liquid of 2350.0 g is now to be collected in the vessel. The two digits in the right-hand positions is set for their analog representation. The liquid is poured into the vessel initially at the rate of 500 g/sec. In response thereto the digit in the highest significant position increases by one in 2 seconds. This change is easy to read. When the digit reaches 2, the pouring speed is reduced to 100 g or less per second. In response thereto the next digit increases by one each second. When it reaches 3, the pouring speed is reduced to 10 g/sec or less. In response thereto the digit in the third position increases by one each second, which is not difficult to read. Whereas, the last two digits increase by one each 0.1 second and 0.01 second, respectively, which are almost impossible to read.

In the present invention, when the digit in the third position reaches 4, the visual inspection can be directed to the analog representation in the display section 5. When the bar extends up to the middle portion of the scale, the pouring speed is gradually reduced. When the bar reaches the scale "100", the pouring is controlled to stop. In this way the desired quantity of liquid is adequately collected in the vessel. The pouring of liquid at the final stage can be easily controlled through the visual inspection of the analog representation. By watching the digital representation, it is ascertained that the desired quantity has been collected in the vessel. The whole operation is completed in about 16 seconds.

In the case of the known display device, no problem in reading arises until the digital changes occur in the third digit. However, when they shift to the fourth digit and below, the difficulty arises. In order to secure a distinct reading, the pouring speed must be reduced to 1 g/sec for the fourth digit and 0.01 g/sec for the last digit. This disadvantageously makes the operation slow down, taking at least 29 seconds.

The procedure described above can be carried out in the automatic mode, which will be explained below:

In the automatic mode, when the pouring speed is 500 g/sec or so, the digits in the second and third positions are represented by analog. When the pouring speed slows down to 100 g/sec or so, the digits in the third and fourth positions are represented by analog. When it is further reduced to 10 g/sec, the digits in the fourth and fifth positions are represented by analog. The analog representation is automatically carried out in accordance with the varying pouring speeds, thereby enabling the operator to inspect the representation continuously from the very beginning.

Figure 4:
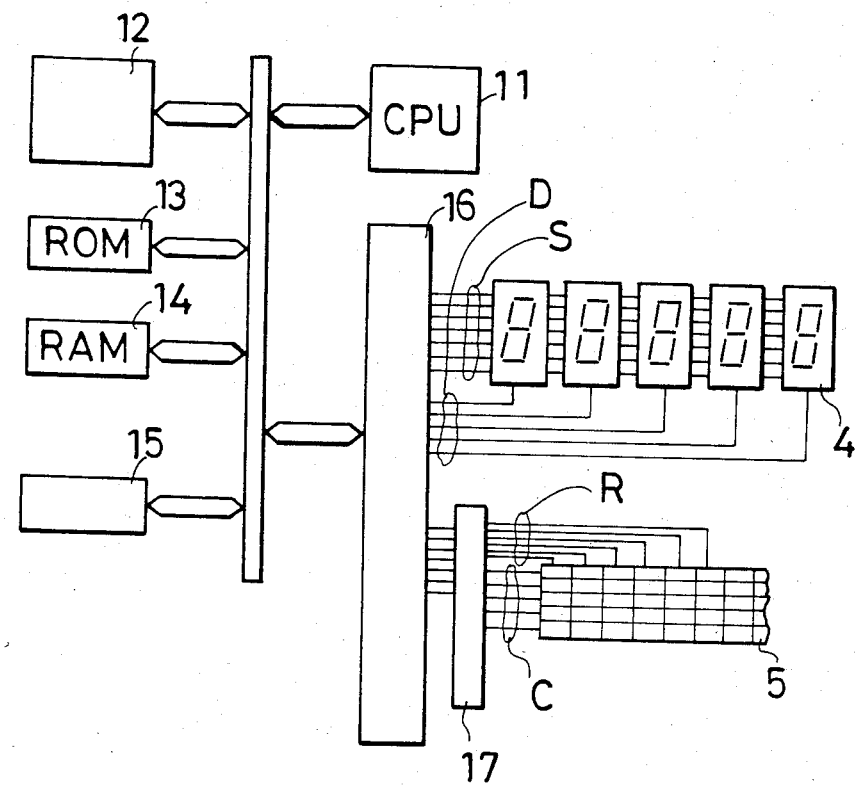
FIG. 4 is a circuit diagram.

A typical example of the circuit for use in the display device embodying the present invention will be explained:

Referring to FIG. 4, the illustrated embodiment is an example in which a microcomputer is employed. A CPU (central processing unit) 11 is connected by a bus line to a load/voltage converter 12, a read-only memory (ROM) 13, a random access memory (RAM) 14 and a key board 15 including the selection key 7. The CPU 11 is further connected to the digital display section 4 through a programmable peripheral interface 16, and to the analog display section 5 through the programmable peripheral interface 16 and a decoder 17. Then, the CPU 11 supplies segment-driving signals S and digit-selecting signals D to the digital display section 4, and supplies row-selecting signals and column-selecting signals to the analog display section 5.

It is possible to arrange the system so as to stop the digital representation when it is not relied upon, during which as described above, the analog representation is inspected.

It is also possible to predetermine the digital position at which the analog representation is automatically started, thereby dispensing with the necessity of providing the selection key 7. This simplifies the structure of the system, and is particularly advantageous when a fixed quantity of liquid is successively collected. As is evident from the embodiment described above, if it is arranged that the corresponding digits are made selectable as desired, it will be of advantage when an approximate quantity is allowed with the recognition of excess or shortage for the desired quantity. For example, the third and fourth digits from the highest position are selected for the corresponding analog representation. This will enhance the efficiency of operation.

Figure 5:
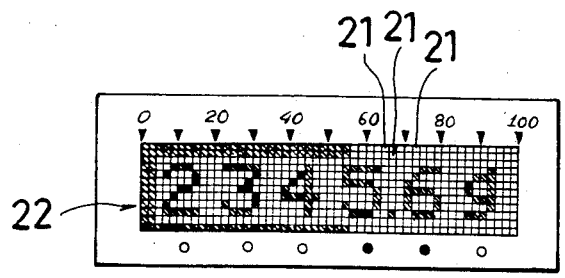
FIG. 5 is a schematic front view showing a modified version of the display section.
Figure 6:
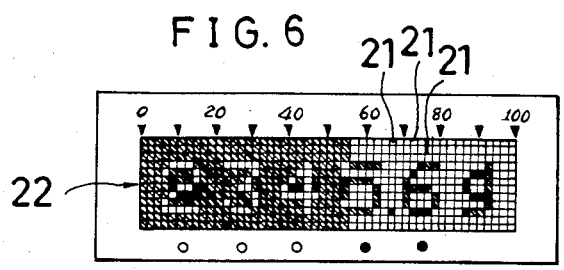
FIG. 6 is a schematic front view showing a further modified version of the display section.

For the analog representation, there can be various forms or shapes. Now, reference will be made to typical examples of the preferred shapes:

In the embodiment described above, the analog representation is made in the form of a bar, which is effected by arranging the display elements in a plurality of lines. Alternatively, the bar-shaped analog representation can be made by aligning 100 elements in a single straight line. In the embodiment illustrated in FIG. 5, display elements 21 are arranged in a plurality rows and lines so as to constitute a dot matrix 22 in the midst of which the digital representation is carried out, and the analog representation appears along the periphery of the matrix 22. Alternatively, as shown in FIG. 6 the analog representation can be carried out in all the area of the matrix 22 except that for the analog representation, wherein it is additionally possible to display the digits in the overlapping portion by switching on and off.

Figure 7:
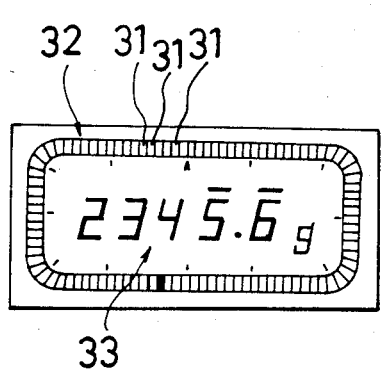
FIG. 7 is a schematic front view showing a still further modified version of the display section.

Referring to FIG. 7, the analog representation is carried out in a loop 32 by arranging display elements 31 in the loop. In this case, it can be arranged that if 100 display elements are employed to constitute the loop 32, a one-round of representation corresponds to the "1" in one higher position than that which the analog representation corresponds to. This facilitates the visual inspection. This type of analog representation can be carried out either by lighting the elements only when they correspond to the corresponding digit in the digital representation or by lighting all the elements from zero up to the corresponding digit. Furthermore, several elements adjacent to the element corresponding to the digit can be simultaneously lit, wherein, when the changing speed is relatively high, all of them are lit, and wherein, when the speed slows down or is stopped, the element corresponding to the digit is lit. This also facilitates the visual inspection. It is also possible to reverse the above-mentioned lighting and the putting-off situation.

Figure 8:
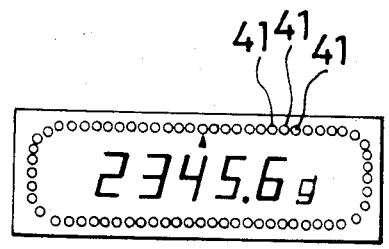
FIG. 8 is a schematic front view showing a modified version of the embodiment of FIG. 7.

In the embodiment illustrated in FIG. 8 display elements 41 are also arranged in a loop, but it will be noted that their intervals are irregular. The shapes of the individual display elements can be determined as desired; a fixed shape is not necessary.

The present invention is not limited to the embodiments described above, but it is possible to make various modifications without departing the spirit of the invention. Modifications, changes and equivalents to the appended claims should be considered as within the scope of the present invention.

What is claimed is:

1. A display device for use in association with an electronic balance, the display device comprising:
   a digital display section for digital-displaying a measured value of a load applied to a scale pan of the balance;
   an analog display section for analog-displaying a value corresponding to a number of digits selected from the digits displayed on said digital display section, said analog display section including a plurality of display elements arranged in series;
   a selection switch for selecting said number of digits; and
   means for indicating the digits selected by said selection switch.

2. A display device as set forth in claim 1, wherein said series of display elements are arranged in more than two straight lines, thereby allowing a bar-shaped representation.

3. A display device as set forth in claim 1, wherein said analog representation is carried out in correspondence to the digits automatically selected in response to the changing speeds of the measured values.

4. A display device as set forth in claim 1, wherein said analog representation is carried out only when the corresponding digits in said digital representation change at a slower speed than a predetermined speed.

5. A display device as set forth in claim 1, wherein said series of display elements are arranged in a loop, thereby allowing a loop-shaped representation.

6. A display device as set forth in claim 5, wherein said display elements arranged in a loop surround said first display section for digital representation.

* * * * *